July 12, 1960     H. W. SCHAUFELBERGER     2,944,499
ARTICLE FEEDING FIXTURE
Filed Sept. 25, 1956     5 Sheets-Sheet 1
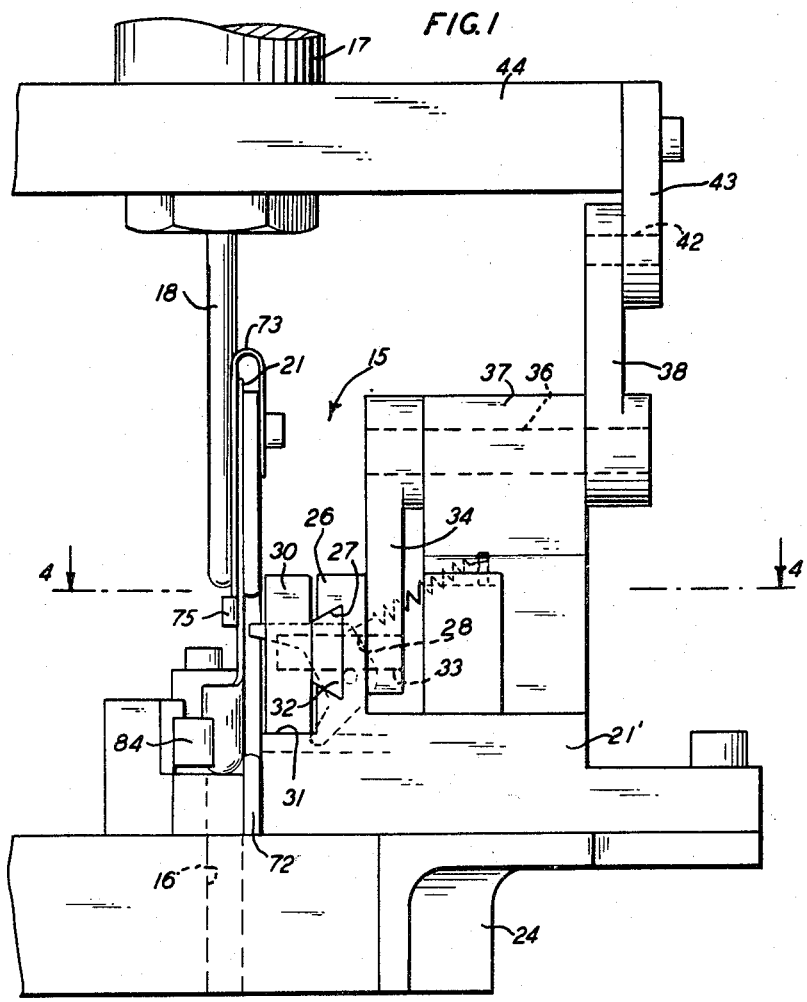
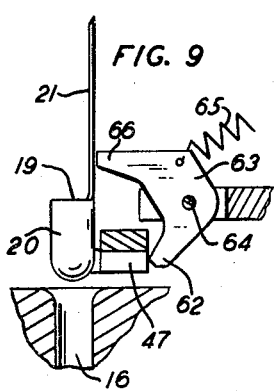
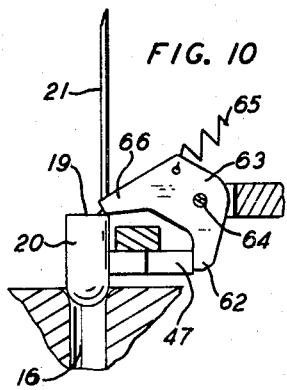
INVENTOR
H. W. SCHAUFELBERGER
BY
ATTORNEY

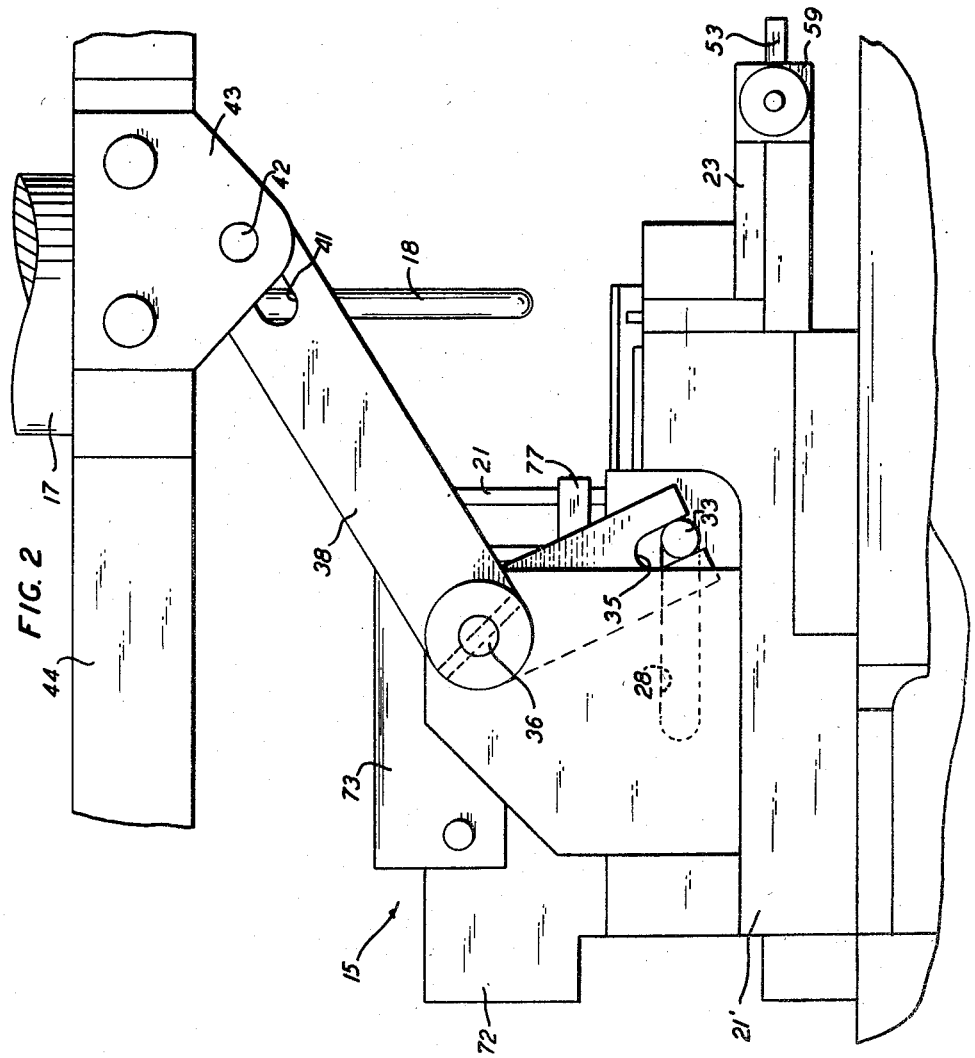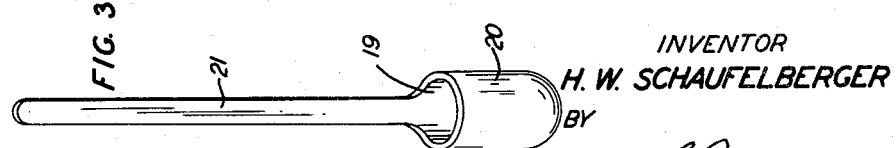

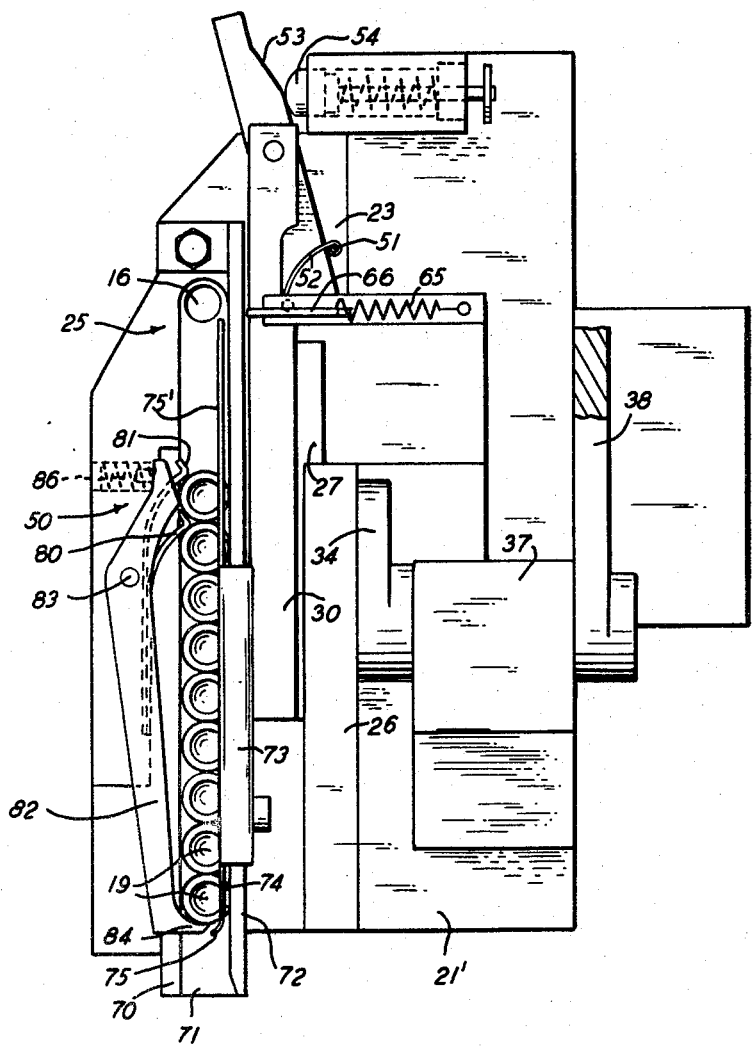

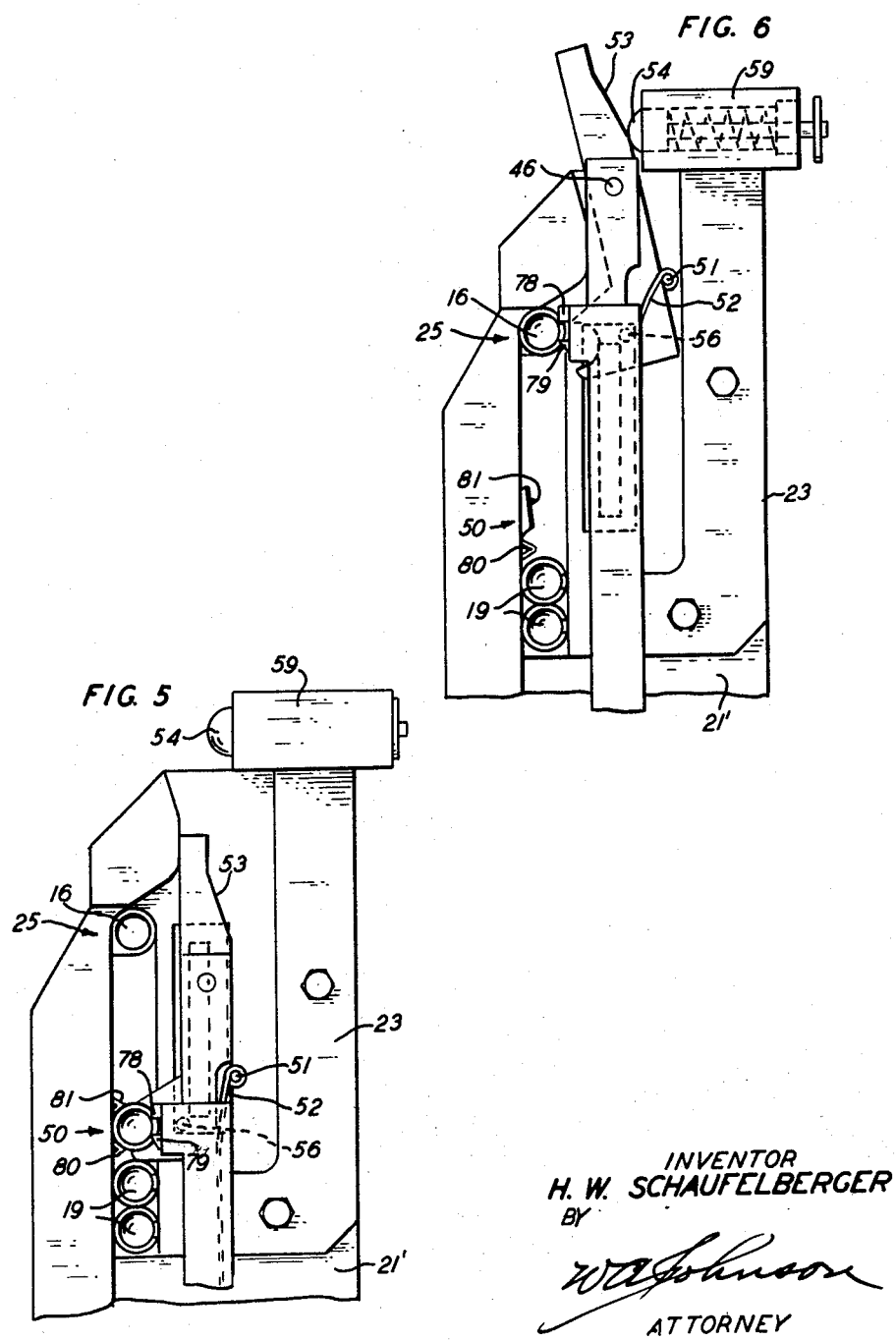

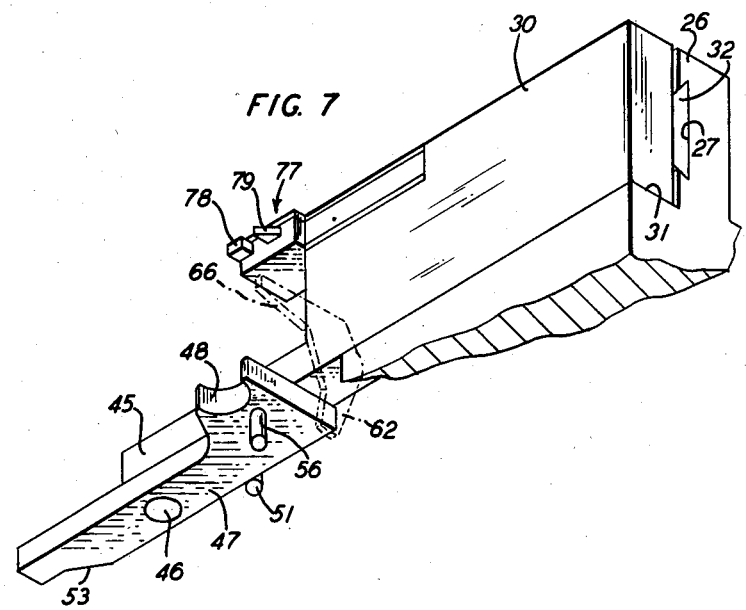
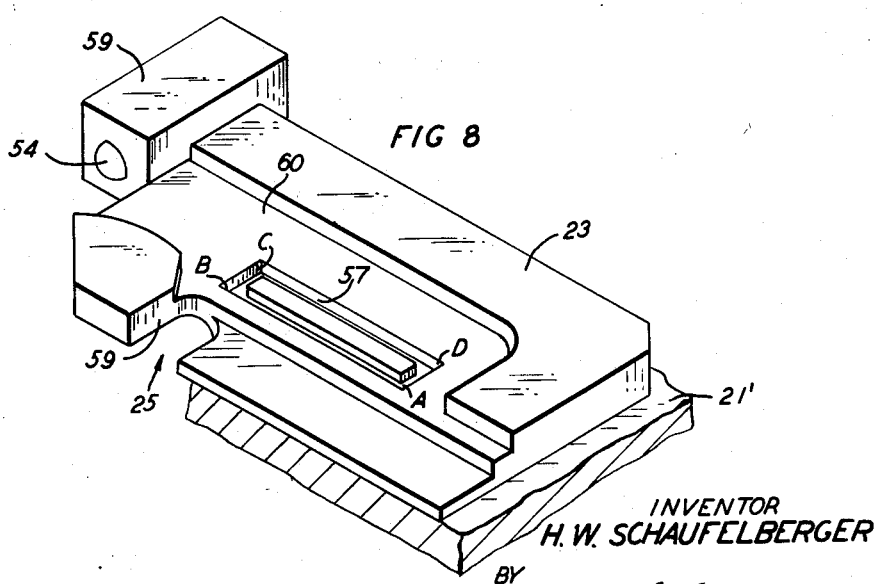

United States Patent Office 2,944,499
Patented July 12, 1960

2,944,499
ARTICLE FEEDING FIXTURE

Henry W. Schaufelberger, Union, N.J., assignor to Western Electric Company, Incorporated, New York, N.Y., a corporation of New York Filed Sept. 25, 1956, Ser. No. 612,020

6 Claims. (Cl. 113—38)

This invention relates to article feeding fixtures particularly those adapted for feeding articles to forming presses.

In the manufacture of certain types of articles, successive forming operations are required to produce the finished article blanked from sheet material. Some articles are initially provided with projections which may be used, by the operator of a press, as handles in feeding the articles manually to the press. Under these conditions, the operator must be depended upon to locate successive articles with the projections in proper preselected positions in the press and to move his hand out of the danger zone prior to starting the operating cycle of the press.

One example is found in the processing steps linked with the forming of shells for jacks used in telephone switchboards. The jack shells are initially blanked from flat stock producing a round portion approximately the size of a quarter of a dollar with a tail-like projection. During the first forming step, the circular portion is given a cup-shape with the tail portion extending vertically from the lip thereof. During successive forming operations, to lengthen the cup-shaped portion and to reduce its diameter, the projecting tail portions have been used as handles in manually placing the articles in forming presses. However, an operator's desire to maintain high production may shorten the time needed for accuracy and safety.

An object of the present invention is a fixture which, although simple in structure, is highly efficient in successively feeding articles to a forming press.

According to the object, the present embodiment of the invention comprises a fixture mounted in a press and actuable by the tool supporting ram to feed successive articles to a die of the press. More specifically, the fixture includes a trough-like member along which a plurality of articles may be fed successively to a receiving position where an element actuated by the tool holder or ram of the press will advance the articles singly to an operating position in alignment with the die. The element is supported by a slide and although it engages the cup-shaped portion of each article directly, associated fingers are supported and movable with the slide to engage the projection of each article to keep it properly oriented while the article is moved to the die. Furthermore, the element is moved out of its feeding path while being returned to the receiving position and during this movement a member is actuated to push the article toward the die. As a protective feature, the trough for the articles is closed at its entrance end by the presence of an article in the receiving position to prevent overloading the fixture.

Other objects and advantages will be apparent from the following detailed description when considered in conjunction with the accompanying drawings, wherein:

Fig. 1 is a front elevational view of the fixture mounted in a press;

Fig. 2 is a side elevational view of the fixture mounted in a press;

Fig. 3 is an isometric view of one of the articles to be formed in the press;

Fig. 4 is a sectional view taken substantially along the line 4—4 of Fig. 1;

Fig. 5 is a fragmentary top plan view of a portion of the feeding means shown in receiving position;

Fig. 6 is a fragmentary top plan view of a portion of the feeding means shown in the loading position;

Fig. 7 is a fragmentary isometric view of the slide with the feeding element and feeding fingers;

Fig. 8 is an isometric view of the structure adjacent the feeding means;

Fig. 9 is a fragmentary side elevational view of a loading member shown in its normal position, and Fig. 10 is a fragmentary detailed view of the structure shown in Fig. 9 with the leading member actuated to move the article toward the die.

Referring now to the drawings, particularly Figs. 1, 2 and 3, the fixture indicated generally at 15 is mounted in a press adjacent a forming die 16. The press has a reciprocable ram or tool holder 17 supporting a forming tool 18 receivable in and cooperating with the forming die 16 to form successive articles 19. In the present instance, the article 19 is produced from a circular blank having an elongate tail portion and after its first forming operation, it has a shallow cup-shaped portion 20 and a vertically extending tail-like portion 21. In the present illustration, successive articles 19 are to be fed to the press and forced through the die 16 by the forming tool 18 to lengthen the cup-shaped portion 20 and to reduce its diameter.

The fixture 15 includes a base 21' and an associated member 23 mounted in the press by the aid of a bracket 24, so that its loading position 25 (Figs. 4, 5, 6 and 8) will be in registration with the die 16. The base 21' includes a vertical projection 26 having a dove-tailed groove 27 therein (Fig. 1) and an elongate aperture 28. A carriage or slide 30 is supported on a surface 31 of the base 23 and provided with a dove-tailed portion 32 disposed in the dove-tailed groove 27 and guided thereby during its longitudinal reciprocation. The longitudinal reciprocation of the slide 30 is brought about through the aid of a pin 33 mounted fixedly in an aperture of the dove-tailed projection 32 of the slide and extending through the elongate aperture 28 for operative connection with a rocker arm 34. The lower end of the arm 34 is bifurcated at 35 (Fig. 2) to straddle the pin 33 and thereby cause reciprocation of the slide 30 during rocking of the arm. The arm 34 is fixedly mounted upon one end of a shaft 36 (Fig. 2) which is journalled in a bearing 37 mounted on the base 21'. The other end of the shaft 36 has a lever 38 pinned thereto and providing a portion of the connection between the shaft and the reciprocating ram 17. The outer end of the lever 38 has an elongate aperture 41 therein for receiving a pin 42 fixed to a bracket 43 which is secured to a member 44 mounted on the ram 17.

The slide 30, as shown in Fig. 7, has a projection 45 which supports a pivot 46 for an element 47. The element 47 has a recess or pocket 48 adapted to receive successive cup-shaped portions 20 of articles 19 at a receiving position indicated generally at 50 (Figs. 4, 5 and 6) and during movement of the slide 30 with the element to transfer the successive articles to the loading position 25 in alignment with the die 16. The element 47 is normally urged into the position shown in Figs. 5 and 7 by a pin 51 carried by a free end of a spring 52, the other end of the spring being fixed to the member 23. A cam surface 53 of the element 47 is positioned to ride over a spring-pressed plunger 54 which functions to rock the element 47 about its pivot 46 against the force of the spring 52 after the element has advanced an article to the loading position 25 adjacent the die 16. A pin 56 carried by the element 47 is adapted to ride in a rectangular path or guideway 57 of the member 23. The member 23, mounted at 58 on the base 21' has a housing 59 for the spring-pressed plunger 54 fixed thereto. A recess 59 of the member 23 registers with the loading position 25 and is disposed in alignment with the die 16. The member 23 has a portion 60 reduced in thickness to allow for longitudinal movement of the element 47 during reciprocation of the slide 30. During the first portion of the longitudinal movement of the element 47 the pin 56 will be caused to ride between points A and B (Fig. 8) during movement of the element with the slide from the receiving positions 50 to the loading position 25 adjacent the die 16. As the cam surface 53 rides on the spring-pressed plunger 54 during the latter portion of the movement between A and B, the plunger is forced inwardly to compress with the spring so that as soon as an article 19 is fed into alignment with the die 16, the pin 56 will be disposed adjacent a lateral portion of the guideway 57 so as to move from B to C. During the return movement of the slide and element, the pin 56 will move in the guideway 57 between C and D, holding the recessed portion 48 of the element 47 away from the path of the articles. When the element 47 reaches the end of its return longitudinal movement, the spring 52 and its pin 51 will function to move the pin 56 laterally in the guideway 57 between D and A. This action moves the pocket 48 of the element 47 into engagement with the next article at the receiving position 50.

Returning to the loading position 25 where the element 47 has moved an article 19 into alignment with the die 16 and is being rocked about its pivot 46 away from the delivered article by the plunger 54 to actuate a lever 63 illustrated in Figs. 1, 7, 9 and 10. The element 47, when rocked, will engage the lower leg 62 of the lever 63, which is pivoted at 64 and normally held in the position shown in Fig. 9 by a spring 65. When the lever 63 is rocked to the position shown in Fig. 10 its leg 66 will strike the top of the cupshaped portion 20 of the article 19 and force it to enter the enlarged mouth of the die 16. When the element 47 returns to the receiving position 50 it is moved away from the lever 63 allowing the spring 65 to return the lever to the position shown in Fig. 9.

In the present embodiment of the invention, a horizontal member 70 is secured to the base 21' and has a horizontal portion 71 to support a plurality of articles 19 from its entrance end to a position adjacent the die 16. A vertical member 72 secured to the base 21 extends from the entrance end of the member 70 to a position beyond the die 16. A resilient retaining member 72 fixed to the vertical member 73 is positioned a distance away from the adjacent wall of the vertical member to guide the tail-like portions 21 of the articles. The resilient member 73 has a portion 74 near the entrance end reduced in size to add flexibility thereto and is provided with a rounded end 75 to permit feeding of the articles thereto. The other end of the member 73 has a similarly reduced portion 75' extending to the loading position 25. The vertical portion 72 and the resilient member 73 are positioned free of a path for a unit 77 (Fig. 7) mounted on the slide 30. The unit 77 has a fixed position member 78 and a spring-actuated latch-like member 79 spaced from each other approximately the distance which equals the width of the tail-like members 21. As the slide returns to the receiving position 50 the latch-like finger 79 will be depressed, while moving back of the tail-like portion 21 of the article and snap back into the position shown, when the slide comes to rest at the receiving position. Therefore, each article being fed to the die is held at the cup portion 20 by the element 47 and at the leg portion 21 by the unit 77.

It is important that an article be disposed in the receiving position 50 ready for each operating cycle of the press, during the upward stroke of which the fixture removes an article from this position and feeds it to the die 16. It is the duty of the operator to keep the fixture loaded, as shown in Fig. 4, and as each new article is moved onto the trough or member 70, the articles are advanced so that the leading article of the group will be moved into the receiving position. This may be determined readily by the presence of springs 80 and 81 positioned before and after the article at the receiving position which function to locate the article properly in this position. It is also important that the leading article stop at the receiving position and that the fixture not be overloaded by the movement of articles beyond the loading position 50. Overloading is prevented by the presence of a lever 82, pivotally supported at 83 and having a gatelike portion 84 to close the entrance of the chute 70 when an article is in the receiving position 50. This is brought about by the article in position 50 engaging the adjacent end of the lever and forcing the lever against the action of a spring 86 to close the gate 84. The spring 86 functions also to open the gate, when the receiving position 50 is empty, by actuating the lever 82 about its pivot.

Considering now the operation of the fixture, it will be apparent that articles may be fed to the fixture at a position away from the danger or working zone of the press to locate articles successively at the receiving position 50. The mechanism connecting the fixture to the press is such that, during the return portion of the operating cycle, the slide 30 is moved from the position shown in Fig. 5 to the position shown in Fig. 4, during which time, the element 47 through its guide pin 56 and the guideway 57 will advance the leading article from the receiving position 50 to the loading position 25 in alignment with the die 16. Immediately thereafter, the element 47 under the pressure of the plunger 54, when the pin 56 reaches the end of its forward stroke, will be moved to the position shown in Fig. 6. While moving in this direction from the position shown in Fig. 9 to the position shown in Fig. 10, the element 47 will actuate the lever 63 to force the article downwardly into the mouth of the die ready for the tool 18 to begin its next cycle. During the next cycle, the tool 18 moves downwardly to force the article 19 through the die 16 and perform the next forming action thereon, particularly upon the cup-shaped portion 20. During the movement of the slide 30 while the ram or tool support 44 moves downwardly, the element 47 is moved from the position shown in Fig. 6 to the position shown in Fig. 5 where it is ready for the next portion of the operating cycle of the press when the ram is moved upwardly moving the tool out of the die and advancing the next article to the die.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fixture for feeding articles, having vertically extending projections, to a forming die and tool of a press wherein the tool is supported by and moved into and out of the die through successive operating cycles by a reciprocable ram, the fixture comprising a slide supported for movement relative to the die and a receiving position spaced from the die, means to guide articles successively to the receiving position, means operatively connecting the slide to the ram to cause reciprocation of the slide in timed relation with the ram, an element pivotally carried by the slide and recessed to receive articles successively, means to control movement of the element about its pivot during reciprocation of the slide to receive articles singly in the recess at the receiving position and transfer them into alignment with the tool and die, means carried by the slide to receive the projection of each article at the receiving position, and means to hold each article against tilting during movement of the article to the die.

2. An article feeding fixture for a press having a forming die and a tool supporting ram reciprocable relative to the die to move the tool through successive operating cycles into and out of the die to form successive articles, the fixture comprising a base fixedly mounted adjacent the die, a slide supported by the base for movement relative to the die and a receiving position spaced from the die, means to support articles for sliding movement in a feeding path through the receiving position to the die, means to stop the articles temporarily at the receiving position, means operatively connecting the slide to the ram to cause reciprocation of the slide in timed relation with the ram, an element movably carried by and reciprocable with the slide between the receiving position and the die and having a recessed portion to straddle the articles singly, means to cause movement of the element relative to the slide to cause the recessed portion to straddle an article at the receiving position and move the article with the slide in the feeding path to the die, means to move the element free of the article at the die, and a feeding member normally positioned free of an article adjacent the die and actuated by the element when moved free of the article at the die to engage the article and start movement of the article into the die.

3. An article feeding fixture for a press having a forming die and a tool supporting ram reciprocable relative to the die to move the tool through successive operating cycles into and out of the die to form successive articles, the fixture comprising a base fixedly mounted adjacent the die, a slide supported by the base for movement relative to the die and a receiving position spaced from the die, a guide to support articles for sliding movement in a feeding path from an entrance end, through the receiving position to the die, means to stop the articles temporarily at the receiving position, a normally open guide actuable by the leading article in the feeding path to close the entrance end of the guide when the article is in the receiving position, means operatively connecting the slide to the ram to cause reciprocation of the slide in timed relation with the ram, an element movably carried by and reciprocable with the slide between the receiving position and the die, means to cause movement of the element relative to the slide to cause the element to engage an article at the receiving position, for movement of the article with the slide in the feeding path to the die, and means to move the element free of the article at the die.

4. An article feeding fixture for a press having a fixed forming die and a tool movable into and out of the die during successive reciprocable operating cycles of a ram of the press on which the tool is mounted to form successive articles, the fixture comprising a support mounted on the press adjacent the die, a slide disposed on the support and movable thereon in a guided path relative to the fixed die and a stationary receiving position spaced from the die, a stationary guide mounted on the support adjacent the slide to support and guide articles moved successively to the receiving position and in a feeding path from the receiving position to the die, means operatively connecting the slide to the ram to cause reciprocation of the slide in timed relation with the ram, an element pivotally carried by the slide and having a portion recessed to straddle the articles successively at the receiving position and transfer them laterally between and in longitudinal alignment with the tool and die, a routing member carried by the element, a guideway cooperating with the routing member to guide the recessed portion of the element with an article in the feeding path of the stationary guide between the receiving position and the die, and means to guide the recessed portion in a return path spaced from the feeding path back to the receiving position.

5. An article feeding fixture for a press having a fixed forming die and a tool movable into and out of the die during successive reciprocable operating cycles of a ram of the press on which the tool is mounted to form successive articles, the fixture comprising a support mounted on the press adjacent the die, a slide disposed on the support and movable thereon in a guided path relative to the fixed die and a stationary receiving position spaced from the die, a stationary guide mounted on the support adjacent the slide to support and guide articles moved successively to the receiving position and in a feeding path from the receiving position to the die, means operatively connecting the slide to the ram to cause reciprocation of the slide in timed relation with the ram, an element pivotally carried by the slide and having a portion recessed to straddle the articles successively at the receiving position and transfer them laterally between and in longitudinal alignment with the tool and die, a routing member carried by the element, a guideway cooperating with the routing member to guide the recessed portion of the element with an article in the feeding path of the stationary guide between the receiving position and the die, means to guide the recessed portion in a return path spaced from the feeding path back to the receiving position, and force applying means effective to rock the element about its pivot and to cause the recessed portion to move from the return path into straddling engagement with an article in the receiving position.

6. An article feeding fixture for a press having a fixed forming die and a tool movable into and out of the die during successive reciprocable operating cycles of a ram of the press on which the tool is mounted to form successive articles, the fixture comprising a support mounted on the press adjacent the die, a slide disposed on the support and movable thereon in a guided path relative to the fixed die and a stationary receiving position spaced from the die, a stationary guide mounted on the support adjacent the slide to support and guide articles moved successively to the receiving position and in a feeding path from the receiving position to the die, means operatively connecting the slide to the ram to cause reciprocation of the slide in timed relation with the ram, an element pivotally carried by the slide and having a portion recessed to straddle the articles successively at the receiving position and transfer them laterally between and in longitudinal alignment with the tool and die, a routing member carried by the element, a guideway cooperating with the routing member to guide the recessed portion of the element with an article in the feeding path of the stationary guide between the receiving position and the die and to guide the recessed portion in a return path spaced from the feeding path back to the receiving position, force applying means effective to rock the element about its pivot and to cause the recessed portion to move from the return path into straddling engagement with an article in the receiving position, and force applying means mounted on the support and positioned to engage the element and force it about its pivot to move the recessed portion from the feeding path adjacent the die to the return path.

References Cited in the file of this patent

UNITED STATES PATENTS

| 818,110 | McElroy | Apr. 17, 1906 |
| 2,019,223 | Hermani | Oct. 29, 1935 |
| 2,663,275 | Collins | Dec. 22, 1953 |